United States Patent [19]

Kamaya

[11] 3,975,765
[45] Aug. 17, 1976

[54] TAPE RECORDING AND/OR REPRODUCING APPARATUS

[75] Inventor: Naoki Kamaya, Tokyo, Japan

[73] Assignee: Sony Corporation, Tokyo, Japan

[22] Filed: Nov. 27, 1974

[21] Appl. No.: 527,515

[30] Foreign Application Priority Data
Nov. 30, 1973    Japan.............................. 48-135158

[52] U.S. Cl................................. 360/60; 360/137
[51] Int. Cl.²......................................... G11B 15/04
[58] Field of Search .................. 360/60, 62, 63, 69, 360/74, 137; 197/98, 107; 74/483 PB; 200/5 B; 235/27, 145

[56] References Cited
UNITED STATES PATENTS
3,735,054    5/1973    Poshimura ........................... 360/69

*Primary Examiner*—James W. Moffitt
*Attorney, Agent, or Firm*—Lewis H. Eslinger; Alvin Sinderbrand

[57] ABSTRACT

The tape recording and/or reproducing apparatus has tape supply and takeup reels and means for moving the tape therebetween at a predetermined speed, and recording and reproducing means, such as mode selecting buttons, for placing the recording and reproducing circuit of the apparatus into the recording or reproducing modes. The recording mode selecting means is interlocked with an instant-stop mechanism which is operative to temporarily and substantially instantaneously stop movement of the tape when the apparatus is in the reproducing mode. In addition the apparatus includes means which will prevent the apparatus from being placed in the recording mode while it is in the reproducing mode, unless the tape is previously stopped by the instant stop mechanism.

22 Claims, 23 Drawing Figures

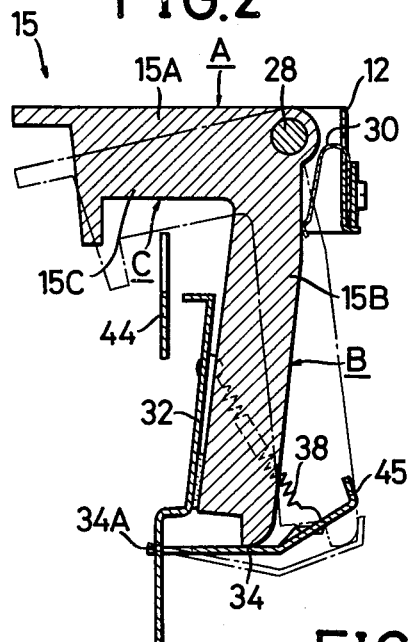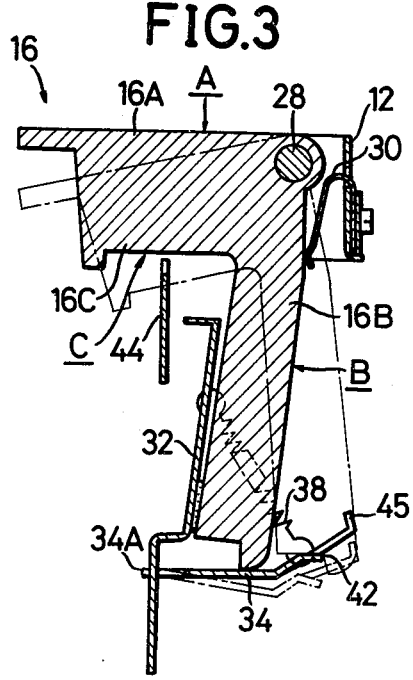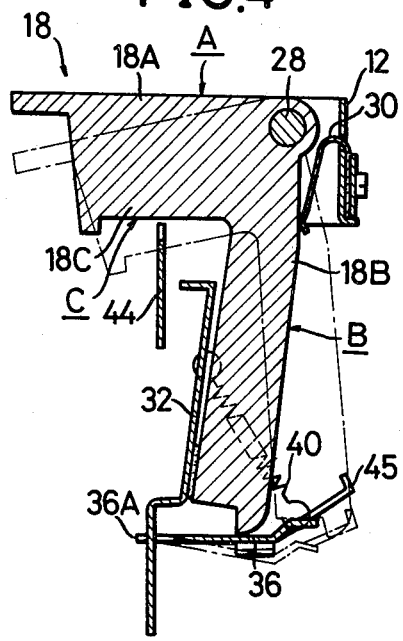

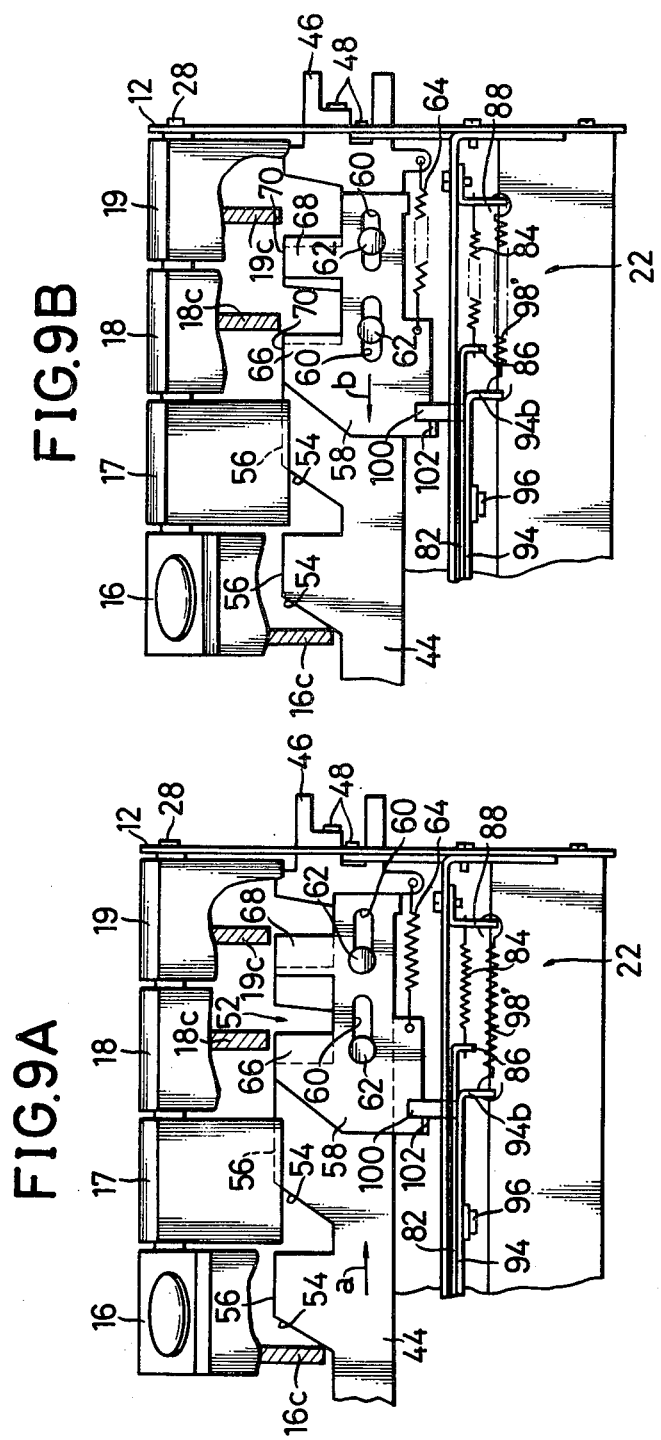

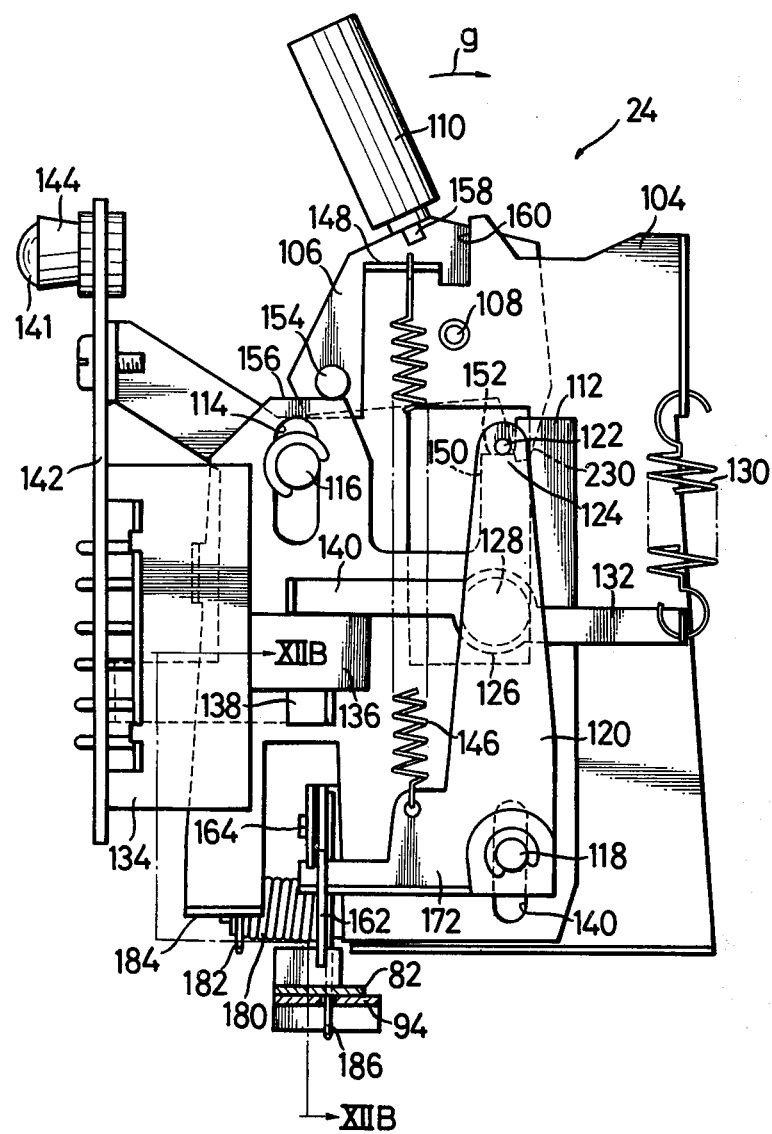

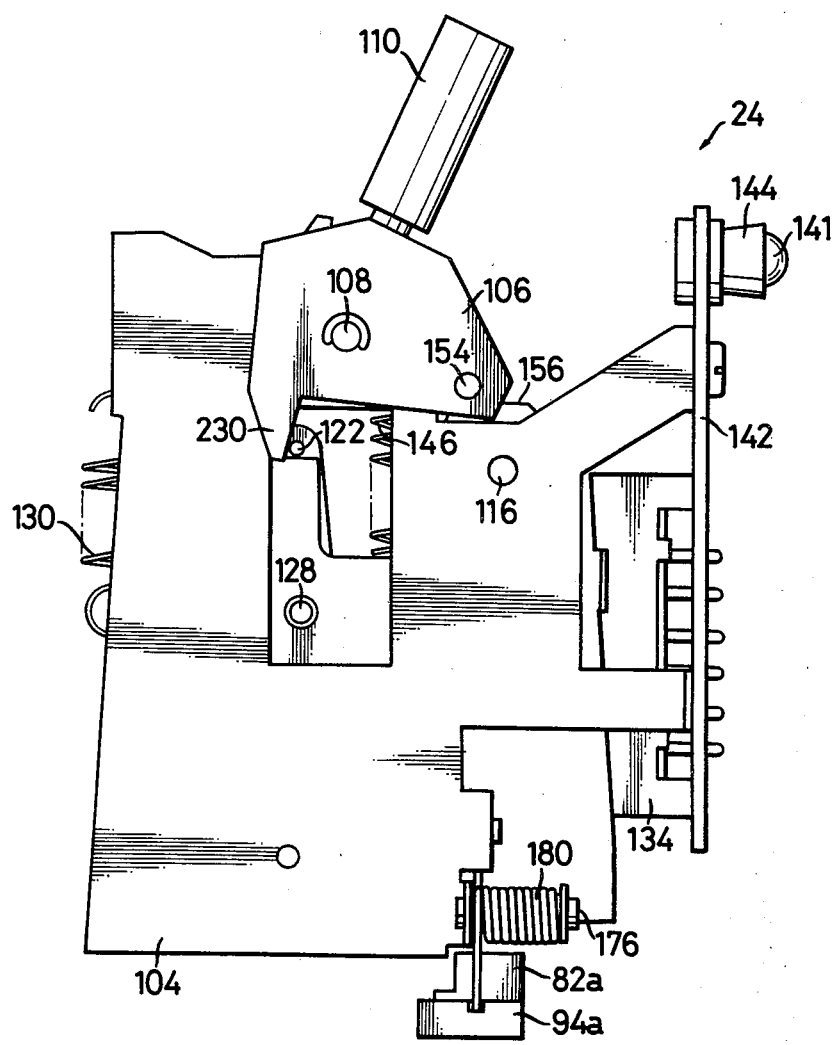

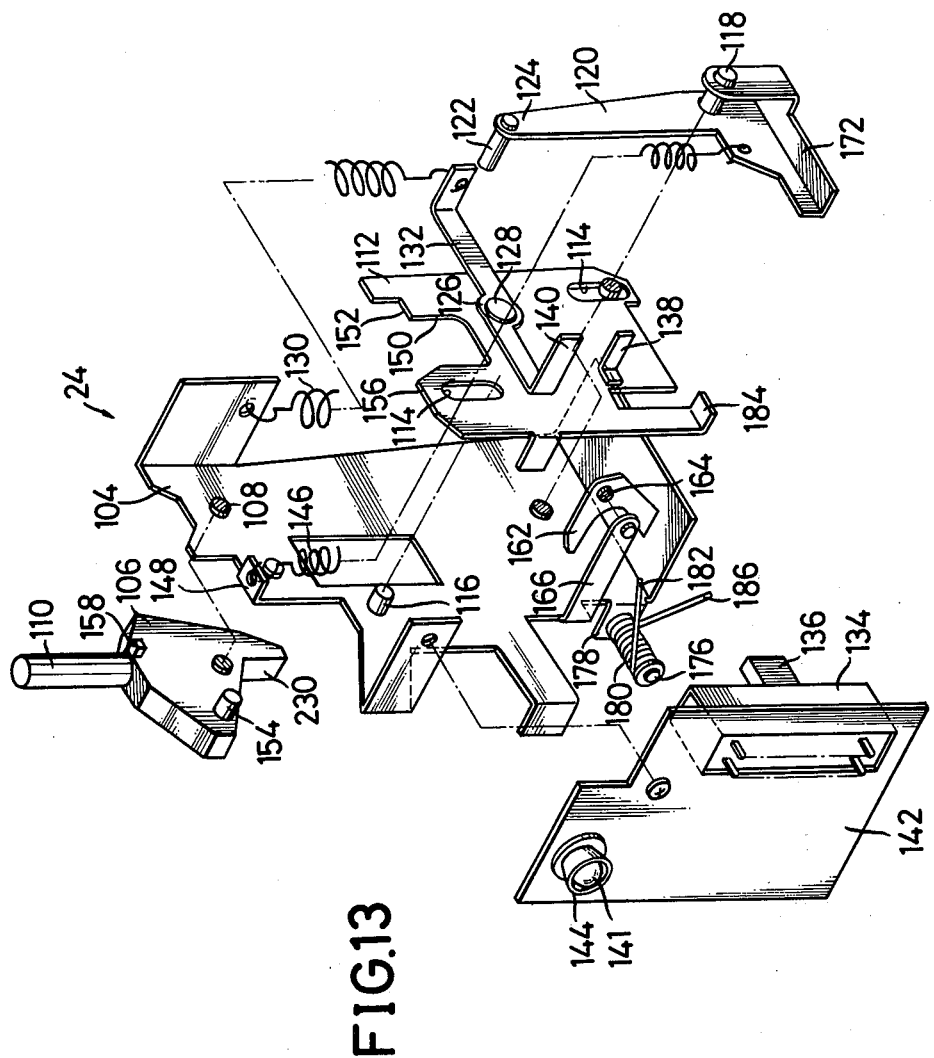

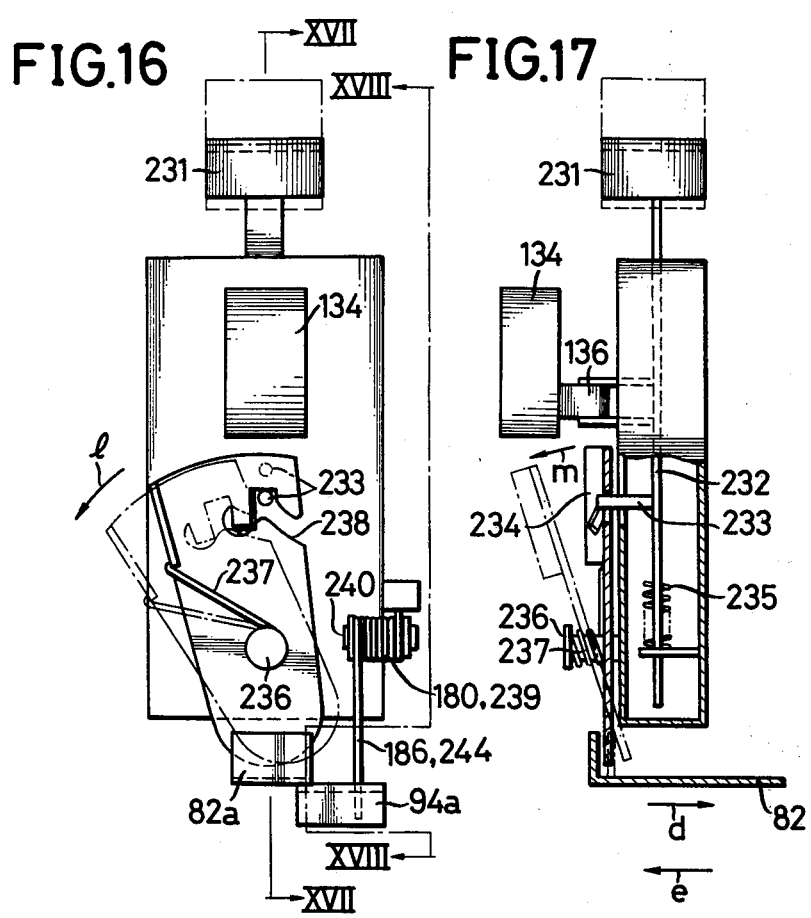

TAPE RECORDING AND/OR REPRODUCING APPARATUS

BACKGROUND OF THE INVENTION

1. Field of the Invention

The present invention relates to a tape recording and/or reproducing apparatus, and more particularly to a tape recording and/or reproducing apparatus in which movement of the tape in the reproducing mode can be temporarily stopped to allow the apparatus to be placed in a record mode.

2. Description of the Prior Art

In previously proposed conventional magnetic tape recording and/or reproducing apparatus, in order to place the apparatus in the recording mode, the normally provided forward and the record pushbuttons must be simultaneously depressed. This usually only can be done after movement of the tape is stopped by depressing the stop button. Accordingly, such previously proposed apparatus have the disadvantage that several operations must be performed before the mode of operation can be changed and further that the buttons must simultaneously be operated by two fingers. For example, when editing tape, the tape must be temporarily stopped in the reproducing—or playback—mode, as by operating the stop pushbutton; then, to change the apparatus over into the recording mode, the normal forward button (which has been released upon actuation of the stop button) must be again depressed, along with the record pushbutton. Such operations are troublesome.

SUMMARY OF THE INVENTION

It is an object of the present invention to provide a tape recording and/or reproducing apparatus which can easily be changed from the reproducing mode to the recording mode by the use of only one finger.

Another object of the present invention is to provide a tape recording and/or reproducing apparatus which is simple in operation and durable in use.

A further object of the invention is to provide a tape recording and/or reproducing apparatus which can be rapidly changed from the reproducing mode to the recording mode during tape editing.

In accordance with one aspect of the present invention, a tape recording and/or reproducing apparatus is provided which includes a conventional tape transporting or moving means for moving magnetic tape from a supply reel to a takeup reel at a predetermined speed and means, e.g. pivoted pushbuttons, for controlling and selecting the mode of operation of the apparatus. The mode selecting means includes a selectively operable button which actuates the moving means to move the tape in a forward direction and to place the apparatus in a mode to reproduce signals recorded on the tape, as well as a selectively actuable button for placing the apparatus in a recording mode. A safety mechanism in the apparatus prevents inadvertent operation of the record button when the apparatus is in the reproducing mode.

In order to condition the apparatus for change over from the reproducing mode to the record mode, without causing release of the reproducing button, a stop mechanism is provided which can substantially instantaneously and temporarily stop movement of the tape while the apparatus is in the reproducing mode. This stop mechanism is operatively connected to the safety mechanism by a release arrangement which will release the safety mechanism when the stop mechanism is actuated and the apparatus is in the reproducing mode, in order to allow the record button to be actuated.

The above, and other objects, features and advantages of the invention, will be apparent in the following detailed description of illustrative embodiments thereof, which is to be read in connection with the accompanying drawings, wherein:

BRIEF DESCRIPTION OF THE DRAWINGS

FIG. 2 is an enlarged sectional view taken along the line II—II in FIG. 1, showing the operation of the stop-button;

FIG. 3 is an enlarged sectional view taken along the line III—III in FIG. 1, showing the operation of the reproducing or play back button;

FIG. 4 is an enlarged sectional view taken along the line IV—IV in FIG. 1, showing the operation of the record button;

FIGS. 9A, 9B and 9C are front views of a portion of the mode selecting assembly shown in FIG. 1, with parts broken away, illustrating the operations of a control plate used in the safety mechanism which normally prevents inadvertent operation of the record button;

FIG. 10B is a side view, similar to FIG. 10A, of the instant-stop mechanism in its second or active condition;

FIG. 11B is a side view, similar to FIG. 11A, of the instant-stop mechanism in its active condition;

FIG. 13 is an exploded perspective view of the instant-stop mechanism shown in FIG. 1;

FIG. 16 is a side view of an instant-stop mechanism constructed according to another embodiment of the invention;

FIG. 17 is a sectional view taken along line XVII—XVII in FIG. 16; and

DESCRIPTION OF THE PREFERRED EMBODIMENTS

Figure 1:
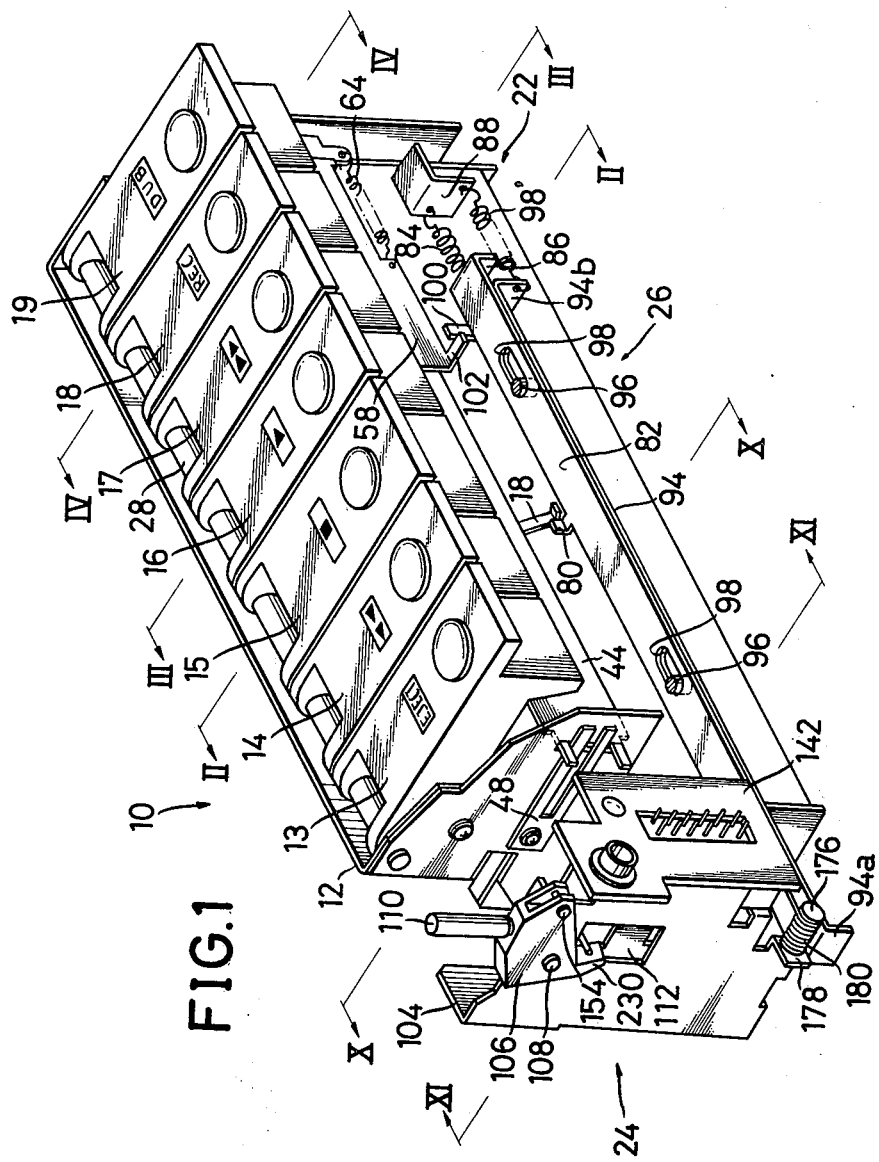
FIG. 1 is a schematic perspective view of a key or pushbutton mode selecting assembly and an instant-stop mechanism of a tape recording and/or reproducing apparatus constructed according to one embodiment of the present invention.

Referring now to the drawing in detail, and initially to FIG. 1 thereof, a mode selecting assembly 10, constructed in accordance with the present invention, is illustrated which is particularly adapted for use with a video tape recorder and reproducing apparatus having supply and takeup reels (not shown) for magnetic tape, driven by one or more motors to move the tape from one reel to the other. However, the mode selecting assembly may be used to equal advantage with sound tape recorders and reproducers and thus the invention is not limited to use with VTR's.

The mode selecting assembly 10 includes a chassis 12 on which a plurality of key-type pushbuttons 13—19 are pivotally mounted. The buttons are connected to the electrical circuits of the tape recording and reproducing apparatus in any convenient or known conventional manner to enable the operator to select the desired mode of the apparatus. As illustrated in FIG. 1, the assembly 10 includes an eject button 13, a rewind button 14, a stop button 15, a normal forward reproducing or playback button 16, a fast forward button 17, a record button 18, and a dubbing button 19. All of the buttons, except stop button 15, are adapted to be retained in a depressed or operative condition by a latch mechanism 20, shown in FIG. 5 and more fully described hereinafter.

The assembly 10 includes a safety mechanism 22 which is adapted to prevent inadvertent operation of the record or dubbing buttons 18, 19 when the reproducing button, fast forward or rewind buttons are in their operative or depressed position. In order to allow the record or dubbing buttons 18, 19 to be operated when the apparatus is in the reproducing or forward movement mode, so as to permit recording, editing, or dubbing, a stop mechanism 24 is provided which allows the operator to substantially instantaneously, and temporarily, stop movement of the tape, as described hereinafter. This stop mechanism is operatively connected to safety mechanism 22 by a release mechanism 26, which will automatically release the safety mechanism when the apparatus is in its reproducing mode and the stop mechanism 24 is actuated, thereby to allow the record or dubbing button to be actuated. The stop and release mechanism operate without releasing the reproducing button from its operative position so that the operator simply needs to depress the record button to record, rather than both the reproducing and record buttons, as in previously proposed arrangements.

In order to facilitate understanding of the invention, each of the principal components thereof will be separately described below, followed by a description of the sequence of operation.

THE OPERATING BUTTONS AND LATCH MECHANISM

Referring to FIGS. 2–5 of the drawing, it is seen that each of the operating buttons 13–19 has a generally L-shaped configuration including a finger engaging portion A and a downwardly extending rear leg B. In addition, each button has a web or thin downward extension C integrally formed with the finger portion A, which cooperates with the safety means 22, as described hereinafter.

The buttons 13–19 are each independently rotatably mounted on a common pivot shaft 28 secured to the chassis 12. A plurality of curved leaf springs 30 are respectively positioned behind each of the buttons 13–19 to urge the buttons clockwise about the common shaft 28, as seen in FIG. 2. This clockwise rotation of the buttons is limited by a front plate 32 mounted on the chassis. In order to place the apparatus in a selected operative mode the selected operating button is depressed, to its operative position, against the bias of its associated spring 30, in a counterclockwise direction.

The latching mechanism 20 is constructed to hold any of the depressed buttons (except stop button 15) in its depressed or operative position and includes a pair of latch plates 34, 36. The latch plate 34 is associated with the buttons 13–17 and the other latch plate 36 is associated with buttons 18 and 19. Each of the latch plates is rotatably or loosely mounted at their forward ends 34A and 36A in slots formed in front plate 32. Tension springs 38 and 40 bias the plates in a counterclockwise direction (as seen in FIGS. 2, 3 and 4) to urge the plates into engagement with the lower ends of the button legs B.

Figure 5:
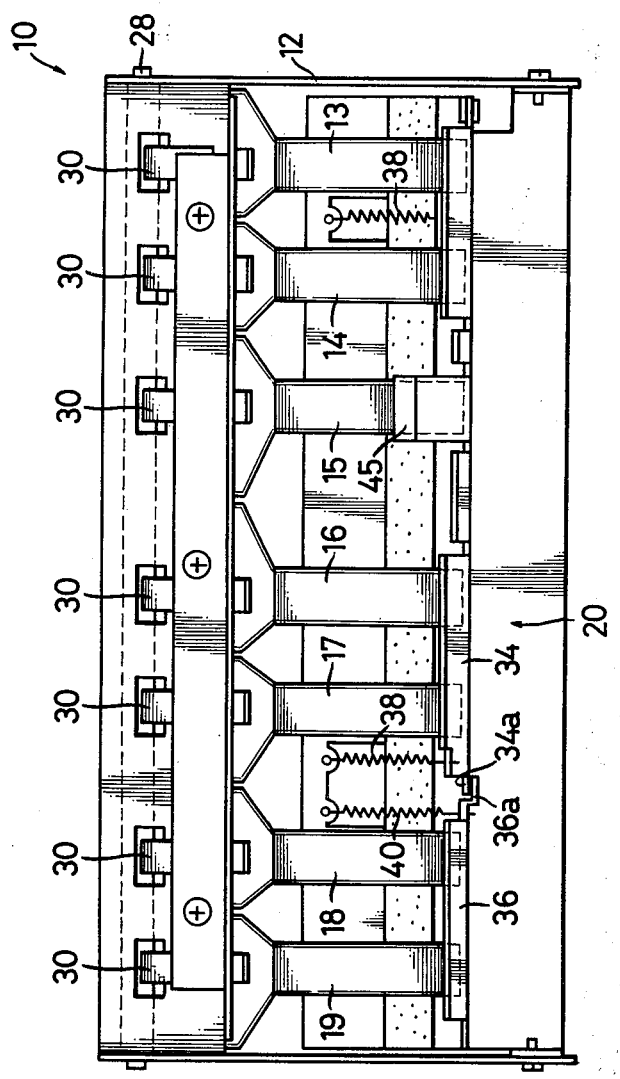
FIG. 5 is a rear view of the mode selecting assembly shown in FIG. 1.

As seen in FIG. 5, the latch plate 34 is independent of latch plate 36 but has an extension 34a which overlies an extension 36a of plate 36. Thus, when plate 34 is depressed against its spring 38, the plate 36 is also depressed.

When any one of the buttons 13, 14, 16, 17, 18 or 19 is depressed, for example when the normal forward or reproducing button 16 or the record button 18 is depressed, from their solid line to their phantom line positions shown in FIGS. 3 or 4, the latch plates 34, 36 associated therewith are rotated clockwise, against the tension springs 38, 40 by the lower ends of the buttons so that the notched portions of these lower ends engage the leading edge of their associated latch plate. Thus, for example, when the normal forward or reproducing button 16 is depressed it is latched in position, as shown is phantom lines in FIG. 3, by the engagement of its lower end against the back edge 42 of the plate 34.

Latch plate 34 has an extension 45 formed from its back edge 42 adjacent the stop button 15, as seen most clearly in FIG. 2. This extension prevents the stop button from being latched in its depressed position, but it engages the lower end of the stop button leg 15B so that the plate 34 is rotated in a clockwise direction when the stop button is depressed. Thus, when stop button 15 is depressed, as shown by the phantom lines in FIG. 2, the latch plates 34 and 36 are both rotated clockwise by the lower end 15B of the stop button, so that the lower end 16B of the normal forward button 16 is disengaged from the rear edge 42 of the latch plate 34, thereby allowing button 16 to return to its original position under the influence of its associated leaf spring 30. Similarly, if the record or dubbing buttons 18 or 19 are depressed, operation of the stop button 15 will cause latch plate 36 to be rotated in a clockwise direction, due to the engagement of the plate extensions 34A, 36A, to release the buttons 18 or 19 when the apparatus is stopped or shut off by operation of button 15. This is shown, for example, in FIG. 4 with respect to record button 18.

THE SAFETY MECHANISM

As mentioned above, the safety mechanism 22 is provided to prevent inadvertent operation of the record or dubbing buttons 18 or 19 when the apparatus is in the reproducing mode. This safety mechanism includes a plate 44 which is disposed beneath the horizontal portions A of the buttons 13–19 adjacent the webs C thereof. (See FIGS. 2 and 6). There are normally two plates for preventing the inadvertent operation of the buttons, which plates can be moved relative to each other. However, one plate is omitted in the illustrated embodiment.

Figure 6:
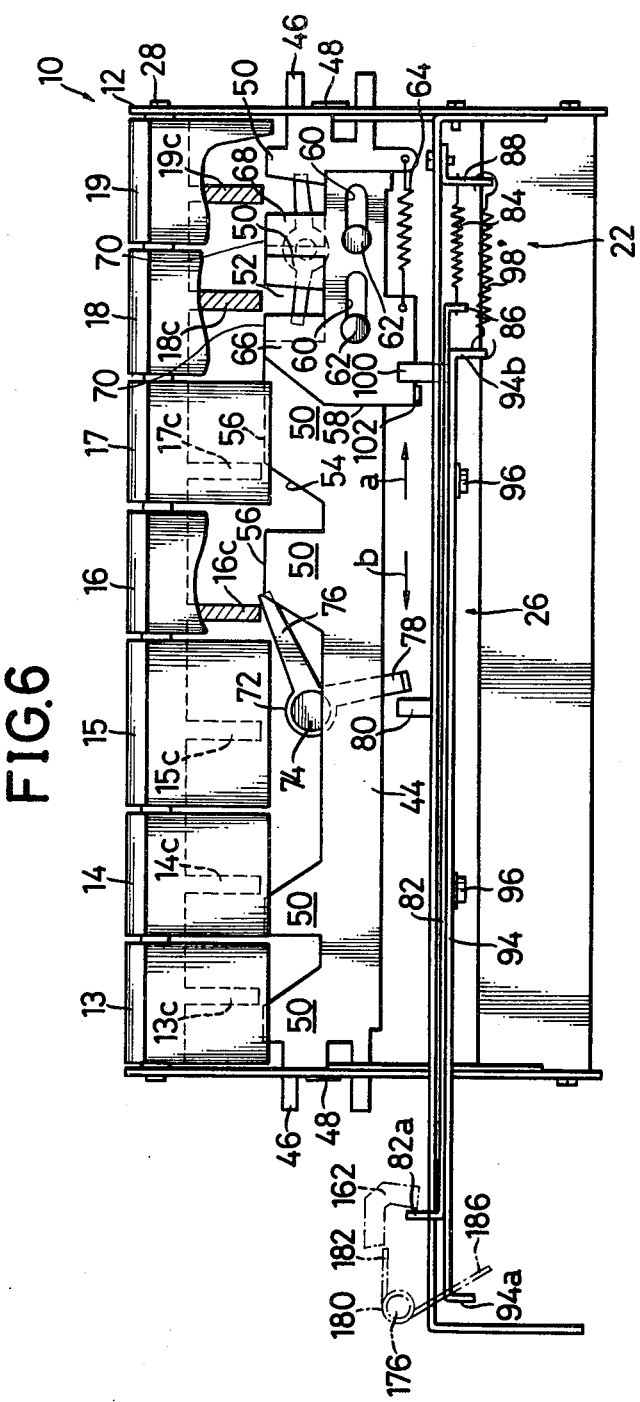
FIG. 6 is a front view of the mode selecting assembly shown in FIG. 1, with parts broken away for clarity.

The plate 44 is slidably mounted in the chassis 12 at each of ends 46, in any convenient manner, and is normally held in a predetermined position (shown in FIG. 6) by a pair of leaf springs 48 secured to both sides of the chassis 12 (see FIG. 1). Six projections 50 are formed on the plate 44, corresponding respectively to the six buttons 13, 14, 16, 17, 18 and 19; no projection is provided for the stop button 15. These projections define therebetween upwardly opening recesses 52 into which the webs C of the buttons can move when the buttons are depressed. In addition, as seen in FIG. 6, at least those projections associated with buttons 13, 14, 16 and 17 have an inclined surface or edge portion 54 which, in the normal inoperative position of plate 44, is located to engage the web C of the button associated therewith. Thus, for example, when the forward or reproducing button 16 is depressed, the inclined edge 54 of its associated projection 50 engages the web 16C of the button 16 so that plate 44 is moved to the right in FIG. 6 (as shown by the arrow a) against the right leaf spring 48. Similarly, when the ejecting button 13 or the rewind button 14 is depressed, the inclined edge 54 of its associated projection 50 engages the web 13C or 14C of the button so that the plate 44 is moved in the direction shown by the arrow b in FIG. 6, against the left leaf spring 48. Accordingly, when plate 44 is moved, and any one of the key-buttons 13, 14, 16, 17, 18 or 19 is locked at its operative position by the latching mechanism, the other buttons (but not stop button 15) cannot be depressed because the top edge of the projections 50 block downward movement of their webs C. Moreover, two or more buttons normally cannot be depressed at the same time.

Plate 44 has an auxiliary control plate 58 slidably mounted thereon beneath the record button 18 and the dubbing button 19. A pair of oblong holes 60 are formed in control plate 58 and a pair of pins 62, secured to plate 44, are respectively inserted through the holes 60 to slidably retain plate 58 or plate 44. A tension spring 64 operatively interconnects plates 44 and 58 so that the control plate 58 is normally biased by the spring into the position shown in FIG. 6.

A pair of projections 66 and 68 are formed in the control plate 44 which are similar to the projections 50. Thus, when plate 44 is moved in the direction a, for example upon depression of the normal forward button 16, the top edges 70 of the pair of the projections 66 and 68 are positioned directly under the webs 18C and 19C of the record and dubbing buttons 18 and 19, to prevent inadvertent actuation thereof.

Figure 7:
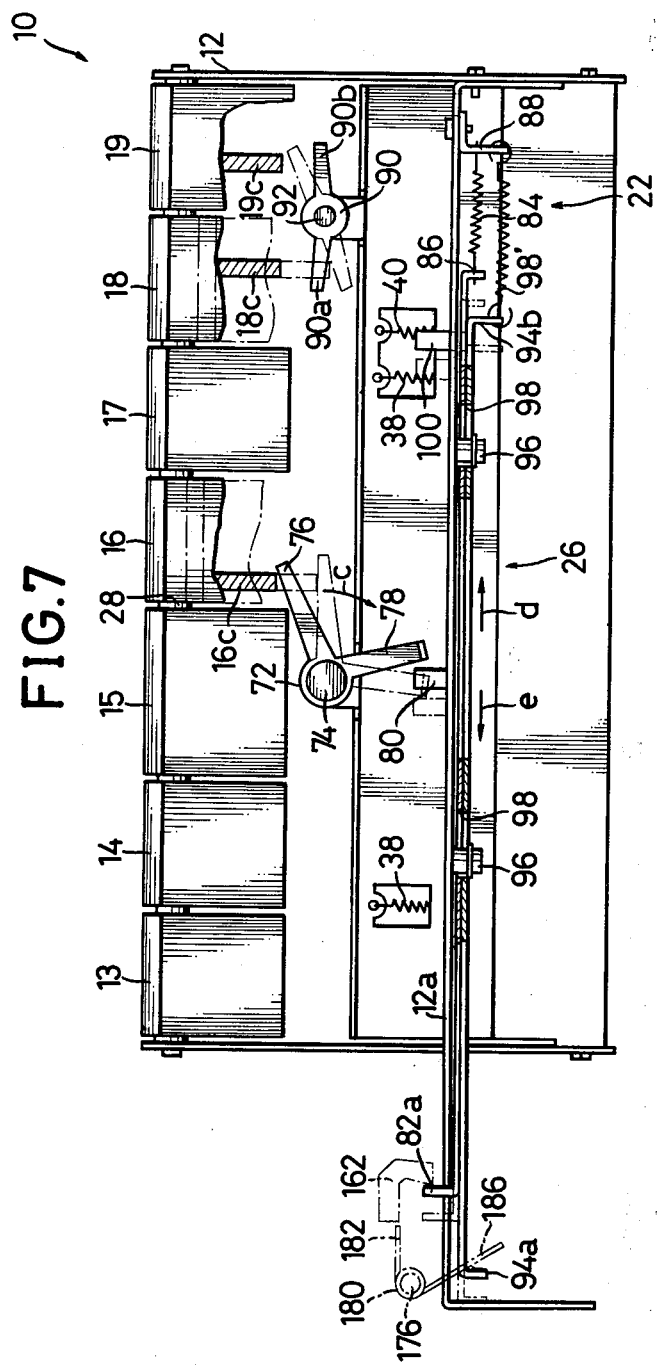
FIG. 7 is a front view, similar to FIG. 6, of the mode selecting assembly, with parts broken away and with parts removed, for clarity.
Figure 8:
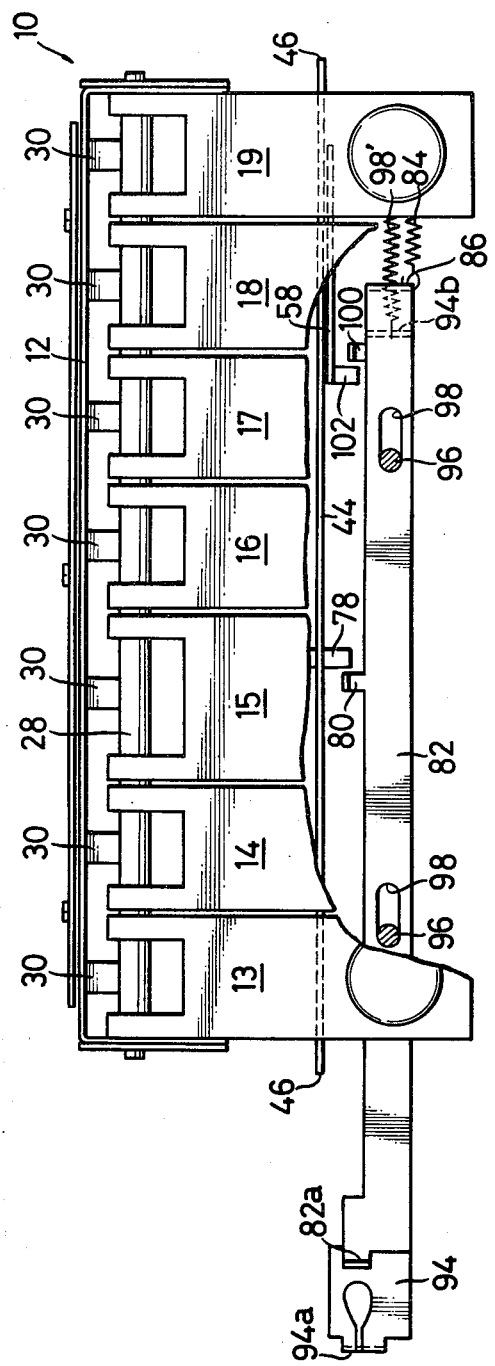
FIG. 8 is a plan view of the mode selecting assembly shown in FIG. 1, with parts broken away.

As shown in FIG. 7, an L-shaped lever 72 is pivotally mounted on chassis 12 by a pivot pin 74 beneath the normal forward button 16. One arm 76 of lever 72 is positioned for contact with the web 16C of the normal forward button 16. Thus, when the normal forward button 16 is depressed, the lever 72 is rotated clockwise around the pin 74 (i.e. in the direction shown by the arrow c in FIG. 7), as shown by phantom lines in FIG. 7. Pivotal movement of this lever in this manner causes the other arm 78 thereof to engage a tab 80 on a slide plate 82, which forms a part of release mechanism 26, to move the plate 82 to the left in FIG. 7, i.e. in the direction of the arrow e. As explained hereinafter, movement of plate 82 in this manner conditions the stop mechanism 24 for operation when the forward button 16 is depressed.

Plate 82 is biased to the right in FIG. 7 (i.e. in the direction of the arrow d) by a spring 84 connected between the end 86 of the plate and a tab 88 on chassis 12. Thus, when forward button 16 is released from its depressed or latched position, e.g. when stop button 15 is actuated, the plate 82 will move in the direction of arrow d to rotate lever 72 in a counterclockwise direction and restore it to the solid line position in FIG. 7.

As also seen in FIG. 7, a lever 90 is pivotally mounted on chassis 12 by a pivot pin 92, beneath the webs 18C and 19C of the record and dubbing buttons 18, 19. Thus the web portions 18C or 19C of the record and dubbing buttons can be engaged with the respective arm portions 90a or 90b of the lever 90 when these buttons are depressed, as described hereinafter. For example, with the depression of record button 18, the web portion 18C of the record button pushes the arm 90a of lever 90 to rotate the lever counterclockwise about pin 90 to the position shown in phantom lines in FIG. 7. In this position, the other arm portion 90b of lever 90 is brought into contact with the web portion 19C of the dubbing button 19, to prevent actuation of that button when the apparatus is in the record mode. On the other hand, when dubbing button 19 is depressed, the web portion 19C of the dubbing button pushes the arm portion 90b of the lever 90 to rotate the lever clockwise about pin 92. In this position, the arm 90a of lever 90 is brought into contact with the web portion 18C of the record button 18, to prevent actuation of the button, when the apparatus is in the dubbing mode. Accordingly, it will be seen that lever 90 is designed so that the record button 18 and the dubbing button 19 cannot be depressed simultaneously and that any one of the buttons 18 and 19 cannot be depressed if the other is depressed.

THE RELEASE MECHANISM

As mentioned, the release mechanism 26 includes the slide plate 82 which is operatively engaged between lever 72 and the stop mechanism 24. The release mechanism also includes a second slide plate 94. These two plates are slidably mounted on chassis 12 in superimposed relation, as seen in FIG. 7, by a pair of guide pins 96 which extend downwardly from the chassis plate 12a through a pair of oblong holes 98 formed in the plate.

The slide plates 82 and 94 have bends 82a and 94a formed on their left ends (as seen in FIG. 7) which operatively interconnect the slides to the stop mechanism 24, as described hereinafter. The right sides of plates 82, 94 have bends 86 and 94b formed therein. The bend 86 of plates 82 is connected to chassis 12 by spring 84 and the bend 94b of plate 94 is connected to chassis 12 by spring 98', so that the springs urge the slides to the right in the direction d (FIG. 7). As described above, actuation of the forward button 16 causes plate 82 to move in the direction e (to the left) through the action of lever 72 to hold this slide plate and its bend 82a in the phantom line position thereof shown in FIG. 7. This conditions the stop mechanism for operation, as described below.

Figure 9C:
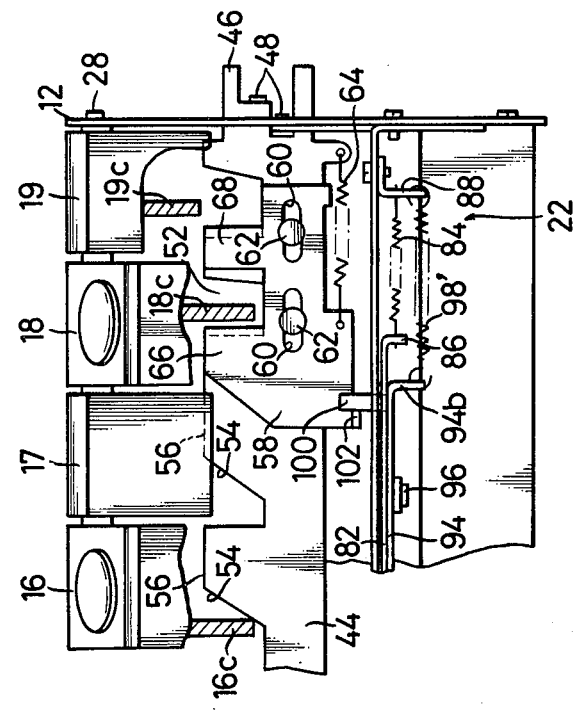

The bend 94a of plate 94 operatively connects that plate to the stop mechanism 24 so that when the stop mechanism is actuated, as described hereinafter, the plate 94 is moved to the left in FIG. 7, i.e. in the direction *e*. The opposite end of the plate 94 has an actuating projection 100 formed thereon which contacts a projection 102 formed on the lower end of the control plate 58 (See FIGS. 6, 8, and 9A-9C) thereby to operatively interconnect the stop mechanism 24 with the safety mechanism 22 and the record and dubbing buttons 18, 19. By this arrangement, when movement of the tape is temporarily stopped by the mechanism 24, the operating slide 94 is moved in the direction *e* against the action of spring 98' from the normal position shown in FIGS. 6 and 9A to the position shown in FIG. 9B. In the normal position of the plate 94, shown in FIG. 9A, the record and dubbing buttons cannot be selectively depressed because plate 58 blocks movement of their webs 18C and 19C. However when the operating slide 94 is moved in the direction *e*, the engagement of projections 100 and 102 causes the control plate 58 to move to the position shown in FIG. 9B so that either of the buttons 18 or 19 can be depressed, as shown in FIG. 9C.

Accordingly, when the normal forward button 16 is depressed, the main safety plate 44 is moved in the direction *a* (FIG. 6) together with the auxiliary control plate 58, so that the projections 66 and 68 of the control plate come directly under the web portions 18C and 19C of the buttons 18 and 19 (FIG. 9A). Since movement of the web portions 18C and 19C of the buttons 18 and 19 is blocked by the top edge of the projections 66 and 68 of the control plate, the buttons 18 and 19 cannot be depressed. However, when movement of the tape is temporarily stopped while the device is in the reproducing mode by the stop mechanism 24, plate 94 is moved to the left, in the direction *e* by the stop mechanism (as described hereinafter) and its actuating projection 100 engages the projection 102 of control plate 58 to move the control plate against the bias of its associated spring 64, in the direction *b* relative to the plate 44 into the position shown in FIG. 9B. Thus, the projections 66 and 68 of control plate 58 are removed to the left (in FIG. 9B) of the web portions 18C and 19C of the record and dubbing buttons, so that these buttons can be selectively depressed.

The operating slide 94 is locked at its leftmost position (i.e. the position shown in FIGS. 9B and C) when the stop mechanism 24 is locked in its active position. When the operating buttons 16 and 18 or 19 are released from the latch mechanism 20 upon depression of stop button 15, safety plate 44 and thus its associated auxiliary control plate 58, are restored to their original positions shown in FIG. 6. This occurs because upon release of forward button 16, the plate 82 will be released to move in the direction *d* in FIG. 7, under the influence of spring 84, to release the stop mechanism 24, as described hereinafter. Release of the stop mechanism allows plate 94 to move in the direction *d* under the influence of its spring 98 so that the engagement of projections 100, 102 is released and plate 58 will return in the direction *a* to its original position, as shown in FIG. 9A. Similarly when stop mechanism 24 is manually restored to its inactive position, as described below, the slide plates 82, 94 will both move in the same manner, in the direction *d*, and control plate 58 will be restored to its original position by the spring 64, unless blocked by one of the webs 18C or 19C.

THE STOP MECHANISM

Referring now to FIGS. 10-15 of the drawing, the stop mechanism 24, used to stop movement of the tape when the apparatus is in the reproducing or forward mode (i.e. when button 16 is latched in its operative position), is shown in detail. This mechanism includes a base plate or bracket 104 secured to chassis 12. An actuator lever 106 is pivotally mounted on the bracket by a pin 108. Actuator 106 includes a handle portion 110 at its upper end by which the actuator can be manually operated.

A slide plate 112 having a pair of oblong holes 114 formed therein is slidably mounted on bracket 104 by means of a pair of guide pins 116, 118 secured to the bracket and extending respectively through the pair of oblong holes. In this manner the slide plate 112 is slidable only in the vertical direction with respect to bracket 104.

A rotary locking plate 120 having a generally L shaped configuration (FIG. 13) is pivotally mounted on pin 118 in any convenient manner. A locking pin 122 for controlling movement of plate 112, is secured on the upper end 124 of the locking plate 120.

Figure 10A:
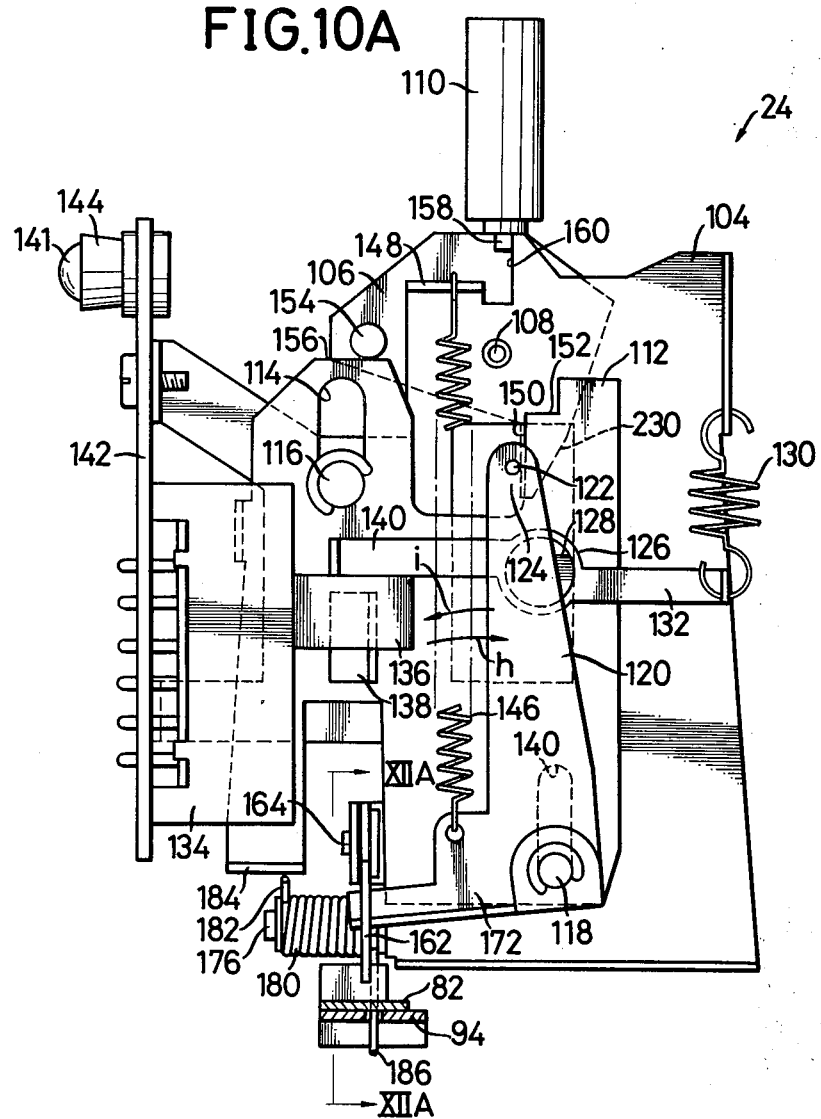
FIG. 10A is a side view of the instant-stop mechanism, in its first or inactive condition, and taken along line X—X in FIG. 1.

A switch operating lever 126 is rotatably mounted, on a pin 128, secured to slide plate 112. This lever is biased in a counterclockwise direction as seen in FIG 10A, by a tension spring 130 which is secured between one end 132 of the switch operating lever and the bracket 104. Spring 130 acts to bias the slide plate 112 in an upward direction.

A switch 134 is mounted on bracket 104 and includes a switch slide or actuator 136. The latter is resiliently engaged between a projection or tab 138 formed on slide plate 112 and the end 140 of the switch operating lever 126. A lamp 141 is secured in the print base plate 142 of the slide switch through a lamp socket 144 to provide a light signal when movement of the tape is stopped. By this arrangement the actuator 136 of the switch is held between the rigid tab 138 and the downwardly biased end 140 of levers 126 so that the spring 130 thus acts to bias plate 112 upwardly (as well as biasing end 140 of lever 126 downwardly) and thereby normally maintains the switch actuator in its upper—or off—position.

The rotary locking plate 120 is normally biased for rotation in a clockwise direction by a tension spring 146 secured between the end 172 of the locking plate and a tab 148 on bracket 104, thereby to urge the pin 122 into engagement with the step shaped edge surface 150 of plate 112. In this manner, when the slide plate 112 is displaced to its lower position (FIG. 10B) the locking pin 122 on the upper end 124 of locking plate 120 moves into engagement with the shoulder 152 of the slide plate 112 to hold the plate in its lower position, against the bias of spring 130 and thereby maintain switch actuator 136 in its down or on position.

In order to move the slide plate 112 downwardly, a pin 154 is rigidly secured to actuator 106 in position to engage the top edge 156 of the plate 112. Thus, upon movement of the actuator from the position shown in FIG. 10A to the position shown in FIG. 10B, the pin 154 will urge plate 112 downwardly so that the edge 150 of the plate 112 moves vertically with respect to pin 122 until pin 122 moves into and then over shoulder 152 to lock the plate 122 against upward movement. It is noted that the vertical position of actuator 106, shown in FIG. 10A, is limited by the engagement of a stop block 158 formed thereon with a shoulder portion or vertical edge 160 formed on bracket 104.

The stop mechanism 24 also includes an inverted L-shaped lever 162 which operatively interconnects the pivotal lock plate 120 to the slide plate 82. The lever 162 is pivotally mounted, by a pin 164 fixed on a tab 166 formed in the bracket 104 (see FIGS. 12A and 13). One arm 170 of the inverted L-shaped lever 162 contacts the horizontal leg 172 of locking plate 120 while the other arm 174 of the inverted L-shaped lever 162 contacts the bend 82a formed on the left end of slide plate 82.

Finally, the stop mechanism 24 includes a pin 76 secured to a tab 178 formed on bracket 104 (FIG. 13), which pin extends parallel to pin 164 and supports a coil spring 180 would thereon. One end 182 of spring 180 contact the lower surface of a tab 184 formed on the lower end of slide plate 112, while the other end 186 of spring 180 is engaged in a cut-out portion formed in the end 94a of the operating slide 94. In this manner the stop mechanism is operatively connected to the release mechanism 22.

Figure 14:
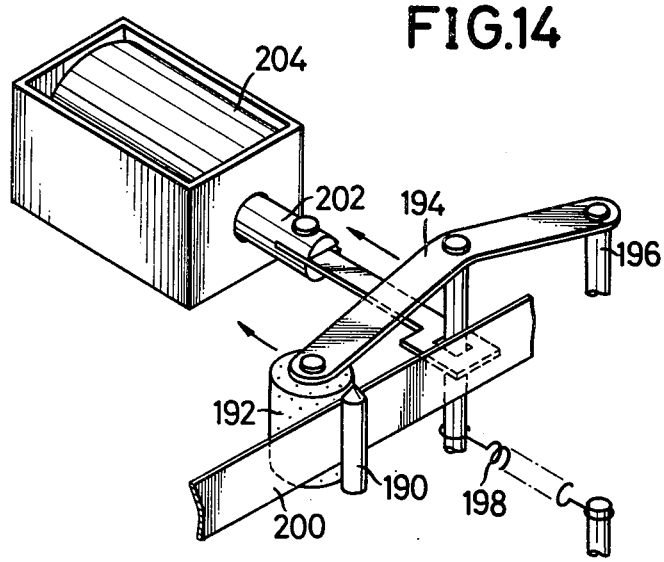
FIGS. 14 and 15 are perspective views of two embodiments of the invention illustrating the relationship between the capstan and pinch roller of the apparatus in the instant-stop operation.

As mentioned, when the actuator slide 136 of switch 134 is in its up position shown in FIG. 10A, the switch is in its off condition, while when the slide is pushed down, as in FIG. 10B, the switch 136 is in its on condition. This switch is used to control the relative position of the conventional idler pinch roller of the tape recording and reproducing apparatus with respect to the driven capstan (as shown in FIG. 14) with which it cooperates to drive the tape from the supply to the takeup reel. To stop movement of the tape the pinch roller is moved away from and out of engagement with the capstan.

As seen in FIG. 14 the apparatus is provided with a conventional capstan 190 which is continuously rotated when the apparatus is in the forward or reproducing mode (i.e. when button 16 is depressed). A pinch roller 192 is also provided which is rotatably mounted on a lever 194 pivoted on the apparatus by a post 196. The pinch roller is normally biased into engagement with the capstan by a spring 198 operatively engaged between lever 194 and a tab fixed in the apparatus. In this manner the magnetic tape 200 is captured between the pinch roller and capstan to be moved thereby when the apparatus is in the forward mode.

Lever 194 is connected to the actuator rod 202 of an electrical solenoid 204. The solenoid is electrically connected to switch 134 in any convenient manner to be energized thereby when the switch is placed in its on condition by movement of actuator 106 to its position 10B. FIG. 10B. When the solenoid is energized the actuator 202 is retracted to pivot lever 194 against the bias of spring 198 thereby to move the pinch roller away from the capstan. When the pinch roller and capstan are disengaged no driving force can be applied to the tape 200. On the other hand, when switch 134 is in its off condition the solenoid is de-energized and lever 194 is pulled to the position shown in FIG. 14 by spring 198 to engage the pinch roller with the capstan and drive the tape.

Figure 15:
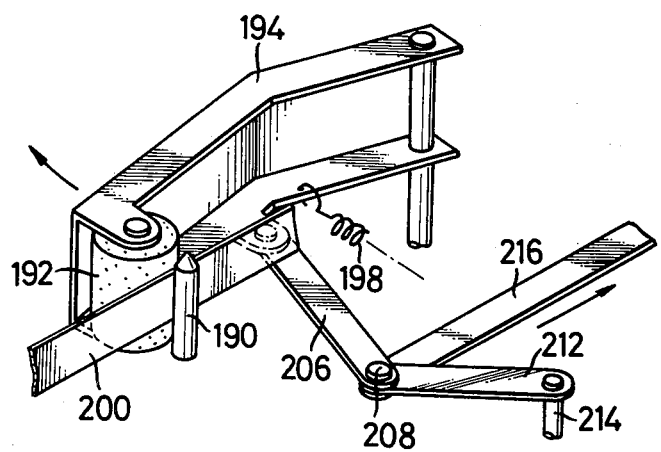

In lieu of the electrical control of the capstan provided by switch 134 and solenoid 204, in another embodiment of the invention, a mechanical linkage arrangement may be used. Such an arrangement is shown in FIG. 15 wherein it is seen that the pinch roller lever 194 is pivotally connected to a link 206 which in turn is pivotally connected by a pin 208 to a link 210. The outer end 212 of link 210 is pivoted on a post 214 of the apparatus positioned such that links 206, 210 are normally angularly related to form a scissors type linkage. The pin 208 is also connected to an operating link 216 whose opposite end 218 is pivotally connected to an inverted L-shaped lever 220. The latter may be pivotally mounted on bracket 104 and has an arm 222 engaged with the lower surface of tab 184 on slide plate 112. By this arrangement, when actuator 106 is moved to the position shown in FIG. 10B, slide plate 112 will move down and pivot lever 220 in a counterclockwise direction (FIG. 12B). This will move link 216 to the right (in FIG. 12B and in the direction of the arrow in FIG. 15) to expand the scissors linkage 206, 210 and move lever 194—and thus pinch roller 192—away from the capstan. When the actuator 106 is in the position shown in FIG. 10A, and plate 112 is in its raised position, the spring 198 will pivot the lever 194 toward the capstan, and close the scissors linkage, thereby engaging the pinch roller with the capstan to drive tape 200.

Thus it is seen that in both the electric control method of FIG. 14 and the mechanical control method of FIG. 15, when slide plate 112 is moved upward to its original position, the pinch roller 192 is pressed against the capstan 190 by the spring 198 so that the tape again is driven.

OPERATION

Figure 11A:
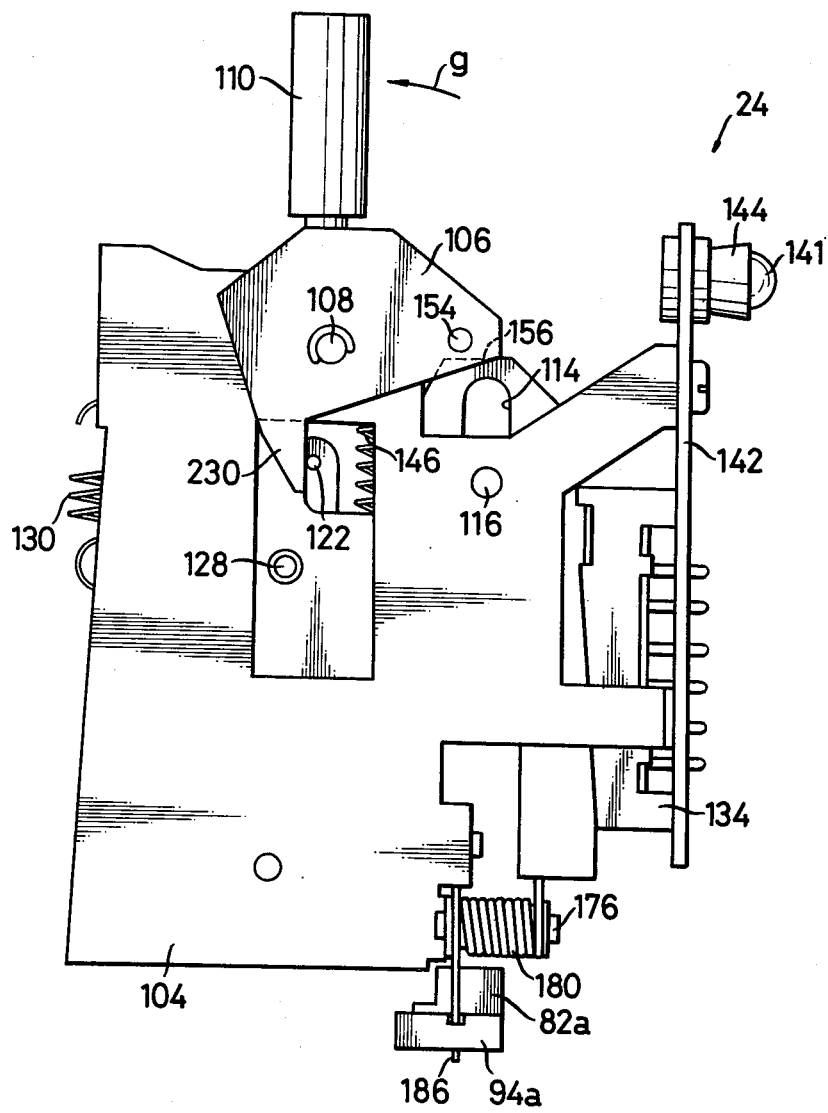
FIG. 11A is a side view of the instant-stop mechanism in its inactive condition, taken along line XI—XI in FIG. 1.

When the apparatus is in its off mode, the elements of the latch, safety and release mechanisms are in the relative positions shown in FIG. 6, while the elements of the stop mechanism are in the positions shown in FIGS. 10A and 11A. In that condition the stop block 158 of actuator 106 engages the surface 160 of bracket 104 and slide plate 112 is in its upper position. Thus the actuator slide 136 of switch 134 is in its off state.

When the tape recording and reproducing apparatus is to be operated in its forward or signal reproducing mode, the button 16 is depressed. As described above, when this button is depressed it is latched in the down or operative position by the plate 34 of the latch mechanism. Movement of the button to the operative position also causes the web 16C thereof to engage the edge 54 of its associated projection 50 to thereby cam plate 44, and thus auxiliary plate 58, to the right, from the position shown in FIG. 6 to the position shown in FIG. 9A. In this position the projections 66 and 68 of control plate 58 will prevent the record or dubbing buttons from being inadvertently depressed.

Of course, since the switch 134 is off, pinch roller 192 is engaged with capstan 190 and tape 200 is moved in the forward direction to reproduce signals on the tape.

Depression and latching of pushbutton 16 in its downward position also causes rotation of lever 72 from its solid to its phantom line position shown in FIG. 7, thereby moving slide plate 82 in the direction e (to its phantom line position in FIG. 7 and its solid line position in FIG. 12B) to condition the stop mechanism for operation.

When the apparatus is in its reproducing mode and it is desired to record or dub material on the tape at a paraticular point, movement of the tape must be accurately stopped to allow the record or dubbing buttons 18, 19 to be depressed. This is done by manually operating the handle 110 to rotate actuator 106 in the direction of the arrow f in FIG. 10B. Rotation of the actuator in this manner causes the pin 154 to depress slide plate 112 downwardly against the action of spring 130. Upon downward movement of slide plate 112, the actuator 136 of switch 134 is moved downwardly due to its engagement with the arm 140 of the switch operating lever 128, so that switch 134 is put into its off state. Movement of switch 134 to its off state, as described above, energizes solenoid 204 to disengage the capstan and pinch roller, thereby stopping movement or drive of the tape.

The lamp 141 indicates that the switch is on and tape movement is temporarily stopped.

When slide plate 112 is moved downwardly in this manner, the locking plate 120 is rotated about the pin 118, in the direction $h$ (FIG. 10A) by the tension spring 146, so that the locking pin 122 of locking plate 120 is engaged with the shoulder 152 of slide plate 112, thereby locking the slide plate at its lower position. Simultaneously, the locking pin 122 engages and pushes against a projection 230 formed on the actuator 106 to hold the actuator in its operative position, and/or aid in locking the stop mechanism in that position.

Figure 12A:
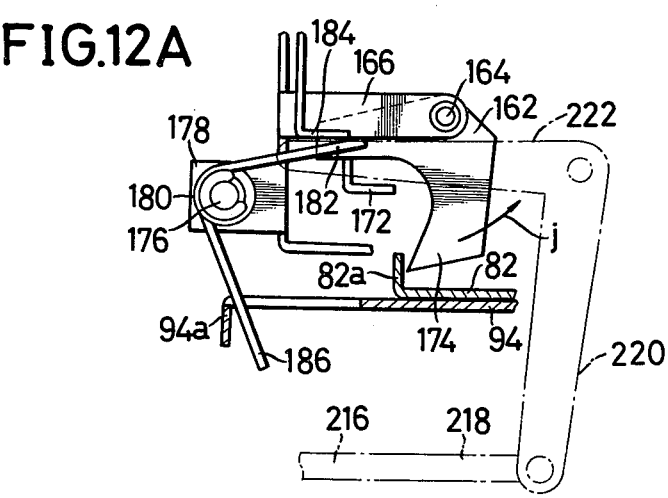
FIG. 12A is a sectional view taken along line XIIA—XIIA in FIG. 10A.
Figure 12B:
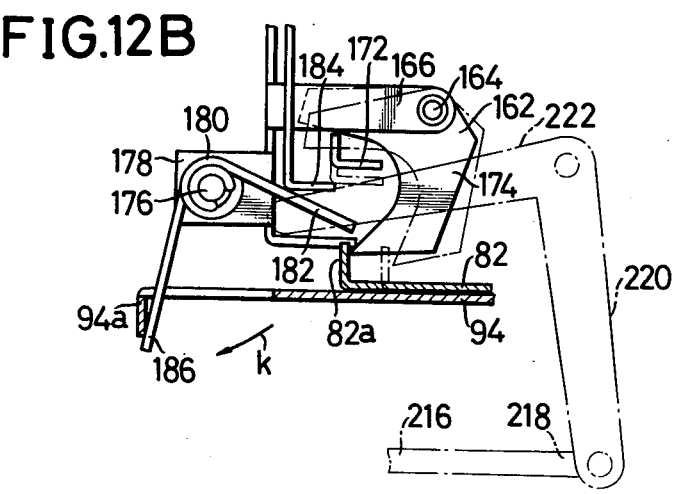
FIG. 12B is a sectional view taken along line XIIB—XIIB in FIG. 10B.

Referring to FIGS. 7, 12A and 12B, it is noted that in the normal position of slide plate 82, as determined by spring 84 (i.e. when button 16 is not operated) the bend 82a thereof is located in the solid line position shown in FIGS. 7 and 12A (and the phantom line position in FIG. 12B). In this position the bend 82a engages the arm 174 of the inverted L-shaped lever 162 and prevents rotation thereof in a clockwise direction (FIG. 12A) about pin 164. Accordingly, the other arm 170 of the inverted L-shaped member 162 engages the horizontal arm portion 172 on the lower end of locking plate 120 to hold the latter in the position shown in FIG. 10A, against rotation in the direction $h$ under the influence of spring 146. As a result, the slide plate 112 cannot be locked in its down position when the handle 110 is operated in the direction $f$. Accordingly, the stop mechanism 24 cannot be locked in its operative condition when the normal forward button 16 is in its inactive or off state, i.e. when it is not depressed.

On the other hand, when button 16 is depressed the operating slide 82 is moved away from the arm 174 of the inverted L-shaped lever 162 (to the solid line position of FIG. 12B and the phantom line position of FIG. 7). In such a condition, the locking plate 120 can pivot under the influence of spring 146 since its arm 172 is no longer blocked and the slide plate 122 can be locked in its lower position, thus locking the switch 134 in its on state. Accordingly, it will be seen that stop mechanism 24 can only be locked in its on state when button 16 has previously been depressed.

When forward or reproducing button 16 has been depressed and the stop mechanism actuated and locked in position, the stop mechanism operates the release mechanism to allow the record or dubbing button to be operated. This occurs as follows: downward movement of slide plate 112 when actuator 106 is moved to the position shown in FIG. 10B causes the lower surface of its tab 184 to engage the end 182 of coil spring 180 and rotate the spring in a clockwise direction $k$ in FIGS. 12A and 12B. This causes the other end 186 of the spring to move in the same direction, thereby sliding plate 94 in the direction $e$ (FIG. 7) from the position thereof in FIG. 12A to the position thereof in FIG. 12B. Movement of plate 94 in the direction $e$ causes its tab 100 to engage the tab 102 of auxiliary control plate 58 and move that plate from its blocking position of FIG. 9A to its released position of FIG. 9B. In that position the projections 66 and 68 of plate 58 no longer block operation of the buttons 18 and 19. Thus one of these buttons can then be depressed to place the apparatus in the record or dubbing mode. As described above, the lever 90 will prevent both of these buttons to be operated simultaneously.

Once one of the record or dubbing buttons is depressed, the stop mechanism must be released in order to re-engage the pinch roller with the capstan so that the tape can again be driven in the forward direction. This is done by manually moving the handle 110 of actuator 106 in the direction $g$ to the position shown in FIG. 10A. When this is done, the locking pin 122 of locking plate 120 is pushed in the direction $i$ (FIG. 10A) by the projection 230 of the actuator 106, thereby to rotate locking plate 120 on guide pin 118 in the direction $i$, against the bias of spring 146. Accordingly, the locking pin is disengaged from shoulder portion 152 of slide plate 112 and the slide plate moves upward under the influence of spring 130. With this upward movement of slide plate 122, the actuator slide 136 of switch 134 is moved upward with the projection 138 of the slide plate to return slide switch 134 to the off state. Accordingly, the tape 200 starts to move again and lamp 141 goes out.

Accordingly, when stop mechanism 24 is released upon actuation of handle 110, the upward movement of slide plate 112 releases the coil spring 180 so that it returns to its original position in FIG. 12A, allowing the operating slide 94 to return, in the direction $d$, to its original position under the influence of spring 98. However the control plate 58 is not returned to its original position by spring 64, since movement of the plate is blocked by the web portion 18C or 19C of the now depressed record or dubbing button 18 or 19. This is shown in FIG. 9C wherein the record button 18C is depressed.

Accordingly, it is seen that to place the apparatus in the recording mode operation, the normal forward button 16 is depressed first, the stop mechanism 24 is operated, the record button 18 or the dubbing button 19 is depressed, and then the instant-stop mechanism is released. Such operations can be very lightly performed by only one finger.

During a tape editing operation, signals on the tape are first reproduced or played back from the tape by depressing button 16 to place the apparatus in the normal forward mode or reproducing mode. As soon as the end of the recorded portion of the tape is found or heard, the instant-stop mechanism 24 is operated and the record button 18 or the dubbing button 19 is depressed. Then the instant-stop mechanism is released. In such operations, misediting of the tape is prevented, and the tape can be rapidly and accurately edited.

If the operator should decide to stop or shut off the apparatus while the stop mechanism 24 is in its locked position, e.g. by depressing the stop button 15, the forward button 16 is released from the latch mechanism 20, as described above. Any other depressed button (e.g. button 18 in FIG. 9C) will also be released. When button 16 is released in this manner, the operating slide 82 is freed to move in the direction $d$ under the influence of its spring 84, thereby to rotate the inverted L-shaped lever 162 in the direction $j$, due to its engagement with bend 82a, to the solid line position in FIG. 12A. The engagement of the arm 166 of lever 162 with the arm 172 of locking plate 120 causes the latter to rotate in the direction $i$ (FIG. 10A) to release the slide plate 112. Thus handle 110 is restored to its original position. Accordingly, the moment the normal forward button 16 is released from the latch mechanism to be restored to its original position, the stop mechanism 24 is also released from its locked position.

Figure 18:
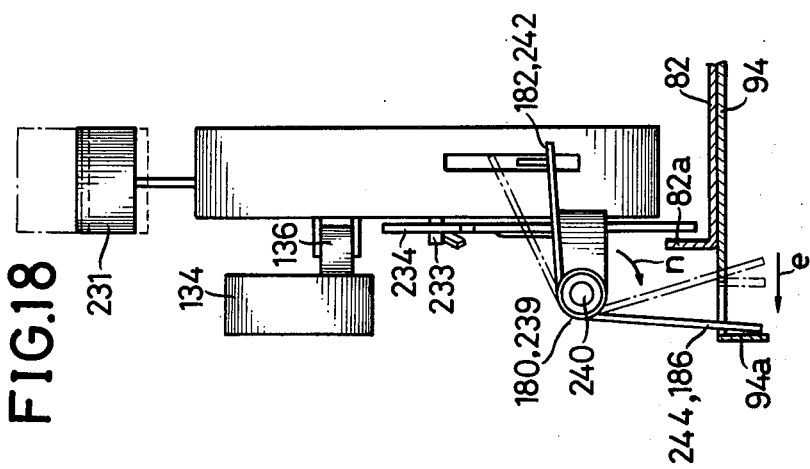
FIG. 18 is a sectional view taken along line XVIII—XVIII in FIG. 16.

FIG. 16–18 illustrate a modification of the stop mechanism 24. The illustrated stop mechanism is of the type "push-push" employed for a cassette deck. This mechanism includes a push-button 231 which is integrally depressed by one step against a compression spring 235, from the phantom to the solid lines in the drawing. The push button includes a slide plate 232 which is operatively connected to the actuator 136 of the slide switch 134 so that the actuator slide is moved down when push button 231 is operated to place the switch in its on state. The switch operates in the same manner as described above to control the pinch roller and stop movement of the tape.

A projection 233 is formed on the slide plate 231 and is engaged with a locking plate 234 in order to lock the slide plate in its down operative position. When the push button 231 is depressed further against compression spring 235, as shown by the dotted line in the drawings, the locking plate 234 is rotated about supporting pin 236 in the direction $l$, against a coil spring 237, by the engagement of projection 233 with the cam surface 238 of plate 234. This is shown by phantom lines in FIG. 16. Thus slide 232 is released from locking and the push button 231 is restored to its original position by the compression spring 235. At the same time, the actuator 136 of the slide switch 134 is moved upward by the slide plate 232, so that the switch 134 is again put in the off state.

Locking plate 234 is interlocked with the bend 82a of the operating slide 82, so that when the operating slide 82 is in its normal position, i.e. when button 16 is not operated, the locking plate is rotated to its inactive position in the direction $m$, as shown by the phantom line in FIG. 17. Accordingly, the stop mechanism cannot be locked unless the normal forward button 16 is depressed.

On the other hand, when button 16 is depressed plate 82 moves in the direction $e$ so that plate 232 will return to its vertical solid line position in FIG. 17. Of course, it will be appreciated that if button 16 is released when the stop mechanism is locked, the plate 82 moves in the direction $d$ and pivots plate 234 to the phantom line position, automatically releasing the stop mechanism.

The stop mechanism of FIGS. 16–18 is operatively connected to the release mechanism by a coil spring 239 rotatably supported on a pin 240. One end 242 of the coil spring 110 is interlocked with the slide plate 232 (FIG. 18) while the other end 244 thereof is interlocked with the bend 94a of the operating slide 94. Thus this spring operates in the same manner as spring 180 previously described in that it is rotated in the direction $n$ when push button 231 is depressed to move plate 94 in the direction $e$, as shown by the solid line in FIG. 18, thereby releasing control plate 58.

The present apparatus can be changed to the recording mode of operation by the use of only one finger, in such a manner that the normal forward key button 16 is first depressed, the stop mechanism is operated, and then the record button 18 of the dubbing button 19 is depressed. The stop mechanism is then released and the apparatus will record on the tape.

Although the stop mechanism of the lever type and the push type have been described in detail, it is to be understood that the invention is not limited to these types and that any stop mechanism of a differnet type can be employed.

Although an illustrative embodiment of the present invention has been described herein with reference to the accompanying drawings, it is to be understood that the invention is not limited to those precise embodiments and that various changes and modifications may be effected therein without departing from the scope or spirit of this invention.

What is claimed is:

1. In a tape recording and/or reproducing apparatus having tape supply and takeup reels and means for moving the tape therebetween; means for controlling the mode of operation of the apparatus including, selectively operable means for placing the apparatus in a mode for reproducing signals on the tape; separate selectively operable means for placing the apparatus in a mode for recording signals on the tape; selectively operable means for temporarily and substantially instantaneously stopping movement of the tape when the apparatus is in either the recording or reproducing modes while maintaining said apparatus in said recording or reproducing mode; means for normally preventing operation of said means for placing the apparatus in the recording mode when the apparatus is in the reproducing mode; and release means operatively connected between said stopping means and said preventing means and operable by said stopping means for releasing said preventing means when the apparatus is in the reproducing mode, thereby to enable said means for placing the apparatus in the recording mode to be operated.

2. In a tape recording and/or reproducing apparatus as defined in claim 1 wherein said stopping means includes means for maintaining the stopping means in an active condition stopping movement of the tape; and interlock means operatively connected between said means for maintaining the stopping means in an active condition and said means for placing the apparatus in the reproducing mode for preventing said means for maintaining the stopping means in its active condition from being operable unless said means for placing the apparatus in its reproducing mode is operated.

3. In a tape recording and/or reproducing apparatus having tape supply and takeup reels and means for moving the tape therebetween; means for controlling the mode of operation of the apparatus including selectively operable means operatively connected to said moving means for actuating said moving means and for placing the apparatus in a mode for reproducing signals recorded on the tape; selectively operable means for placing the apparatus in a mode for recording signals on the tape when said means for placing the apparatus in a reproducing mode is operated; selectively operable means for temporarily and substantially instantaneously stopping movement of tape in the apparatus when the apparatus is in the reproducing mode while maintaining said apparatus in said reproducing mode; and means operatively connected to said stopping means for normally preventing operation of said means for placing the apparatus in a recording mode when the apparatus is in the reproducing mode, and means for overriding said preventing means to allow the means for placing the apparatus in a recording mode to be operated when said stopping means is operated.

4. In a tape recording and/or reproducing apparatus as defined in claim 3 wherein said stopping means includes means for maintaining the stopping means in an active condition stopping movement of the tape; and interlock means operatively connected between said means for maintaining the stopping means in an active condition and said means for placing the apparatus in the reproducing mode for preventing said means for maintaining the stopping means in its active condition from being operable unless said means for placing the apparatus in its reproducing mode is operated.

5. In a tap recording and/or reproducing apparatus having tape supply and takeup reels and means for moving the tape therebetween; means for controlling the mode of operation of the apparatus including a plurality of independently actuable means for selecting and establishing the mode of operation of the apparatus including means for establishing a reproducing mode in which the tape is driven by said moving means from the supply reel to the takeup reel and signals on the tape are reproduced; and means for establishing a recording mode in which signals are recorded on the tape; releasable safety means for normally preventing actuation of said means for establishing a recording mode while said means for establishing a reproducing mode is actuated; selectively actuable means for temporarily and substantially instantaneously stopping movement of the tape; and release means operatively connected between said stopping means and said safety means for releasing said safety means while maintaining said apparatus in the reproducing mode when said stopping means is actuated thereby to enable said means for establishing a recording mode to be operated to record signals on the tape.

6. In a tape recording and/or reproducing apparatus as defined in claim 5, including a chassis; said mode establishing means comprising operating buttons movably mounted on the chassis, and said releasable safety means including a plate slidably mounted in said chassis beneath each of said buttons; said plate having a plurality of spaced recesses formed therein beneath and opening towards the buttons, and at least one inclined cam surface formed thereon adjacent the button for establishing the reproducing mode, said surface beng inclined toward the button for establishing the recording mode and being engaged with said reproducing button whereby actuation of said reproducing button moves said plate laterally with respect to said buttons to move the recess associated with said recording button from beneath that button, whereby said plate blocks actuation thereof.

7. In an apparatus as defined in claim 6, wherein said plate includes a control plate slidably mounted thereon and having said recess associated with the button for establishing the recording mode formed therein, resilient means operatively connected between said plate and said control plate for normally holding the control plate in a predetermined position wherein it blocks movement of said recording mode button when the reproducing mode button is actuated and said plate is moved in response thereto; said release means comprising means for moving said control plate against the bias of said resilient means when said stopping means is actuated, thereby to position the recess in the control plate below the recording mode button to allow the recording button to be actuated.

8. In an apparatus as defined in claim 7 including resilient means normally biasing said plate into a first position wherein said cam surface is positioned for engagement by said reproducing mode button upon actuation thereof.

9. In an apparatus as defined in claim 5 wherein said stopping means is movable from a first inoperative position to a second active position in which movement of the tape is stopped, means for maintaining the stopping means in said active position for stopping movement of the tape; and interlock means operatively connected between said means for maintaining the stopping means in said active position and said means for establishing a reproducing mode for preventing said means for maintaining the stopping means in its active position from being operable unless said means for establishing the reproducing mode is operated.

10. In an apparatus as defined in claim 9 including a chassis; said means for maintaining the stopping means in its active position including a first plate operatively connected to said stopping means and slidably mounted on said chassis for movement between first and second positions corresponding respectively to the inactive and active positions of said stopping means; a second plate pivotally mounted on said chassis adjacent said first plate and having an abutment member formed thereon; said first plate having an abutment formed thereon for cooperation with said abutment on the second plate in the second position of the first plate; said abutments being positioned to prevent movement of said first plate from its second to its first position when engaged; resilient means for biasing said abutment on the second plate into engagement with the abutment on the first plate; actuator means for moving said first plate from its first to its second position to cause engagement of said abutment surfaces; whereby said stopping means is held in its active position and said interlocking means comprising means for holding the abutment of said second plate away from the abutment of the first plate unless said means for establishing a reproducing mode is operated whereby the stopping means cannot be held in its active position unless said means for establishing a reproducing mode is operated.

11. In an apparatus as defined in claim 10 wherein said first plate is spring biased towards said first position.

12. In an apparatus as defined in claim 11 wherein said actuator comprises a lever pivotally mounted on said chassis for movement between first and second positions corresponding to the first and second positions of said first plate and including means for engaging said second plate to pivot the second plate against the bias of its associated spring means when the lever is moved from its second to its first position, thereby to disengage said abutment surfaces and allow said first plate to return to its first position under the influence of said spring bias to return said stopping means to its inactive position.

13. In an apparatus as defined in claim 11, wherein said actuator is a push button directly connected to said first plate.

14. A tape recording and reproducing apparatus having tape supply and takeup reels and means for moving the tape therebetween; said apparatus including a chassis, a plurality of selectively operable control buttons for selecting and establishing the mode of operation of the apparatus; said buttons being pivotally mounted on said chassis for movement between first inoperative positions and second operative positions; latch means for holding said buttons in their second operative position when pivoted thereto; said buttons including a button for establishing a reproducing mode in which the tape is driven by said moving means from the supply reel to the takeup reel and signals on the tape are reproduced, and at least one button for establishing a recording mode in which signals are recorded on the tape; said buttons having extensions formed thereon extending downwardly therefrom;

releasable safety means for normally preventing movement of said recording button to its operative position when the reproducing button is in its operative position; said safety means including a plate slidably mounted in said chassis beneath each of said buttons; said plate having a plurality of spaced recesses formed therein, beneath and opening towards said buttons for normally allowing passage of said button extensions therethrough; resilient means normally maintaining said plate in a first position with said openings located below their associated buttons; said plate having an inclined cam surface formed thereon adjacent the reproducing button; said surface being inclined towards the recording button and positioned to engage the extension of said button as it is moved towards its second position thereby to move said plate laterally with respect to said buttons to move the recess associated with the recording button from beneath that button whereby said plate engages the extension of the recording button to normally prevent movement to its operative position when the reproducing button is in its operative position;

selectively actuable means for temporarily and substantially instantaneously stopping movement of the tape; said stopping means being mounted on said chassis for movement between a first inoperative position and a second active position in which movement of the tape is stopped; means for maintaining the stopping means in said active position when the reproducing button is in its operative position;

interlock means operatively connected between said maintaining means and said reproducing button for preventing said maintaining means from maintaining the stopping means in its active position unless the reproducing button is in its operative position; and release means operatively connected between said stopping means and said safety means for moving said safety means, when the stopping means is actuated, to a position wherein the recess associated with the recording button is returned below the extension of that button thereby to enable the recording button to be operated to record signals on the tape.

15. An apparatus as defined in claim 14 wherein the plate of said safety means includes an auxiliary control plate having said recess associated with said recording button formed therein; resilient means operatively connected between said plate and said auxiliary control plate for normally holding the control plate in a predetermined position wherein the auxiliary plate will engage the extension of the record button and prevent movement thereof to its operative position when the reproducing button is in its operative position and said plate is moved in response thereto;

said release means including means for moving said control plate against the bias of said resilient means when said stopping means is actuated, thereby to position the recess in the control plate beneath the recording button to allow the recording button is be actuated.

16. Apparatus as defined in claim 15 wherein said means for moving the control plate comprises a first interconnecting plate slidably mounted in said chassis and operatively connted between said maintaining means and said auxiliary control plate; said maintaining means including means for sliding said first interconnecting plate in said chassis, when the stopping means is placed in its second active position, in a direction to move said auxiliary plate against the bias of its associated resilient means and position the recess therein beneath said recording button.

17. Apparatus as defined in claim 16 wherein said maintaining means including a first plate operatively connected to said stopping means and slidably mounted on said chassis for movement between first and second positions corresponding respectively to the inactive and active positions of said stopping means; a second plate pivotally mounted on said chassis adjacent said first plate and having an abutment member formed thereon; said first plate having an abutment formed thereon for cooperation with said abutment on the second plate in the second position of the first plate; said abutments being positioned to prevent movement of said first plate from its second to its first position when engaged; resilient means for biasing said abutment on the first plate; actuator means for moving said first plate from its first to its second position to cause engagement of said abutment surfaces; whereby said stopping means is held in its active position and said interlocking means comprising means for holding the abutment of said second plate away from the abutment of the first plate unless said reproducing button is operated, whereby the stopping means cannot be held in its active position unless the reproducing button is operated.

18. An apparatus as defined in claim 17 including spring means for biasing the first plate of said maintaining means towards its first position.

19. An apparatus as defined in claim 18 wherein said actuator comprises a lever pivotally mounted on said chassis for movement between first and second positions corresponding to the first and second positions of said first plate and including means for engaging said second plate to pivot the second plate against the bias of its associated spring means when the lever is moved from its second to its first position, thereby to disengage said abutment surfaces and allow said first plate to return to its first position under the influence of said spring bias to return said stopping means to its inactive position.

20. An apparatus as defined in claim 19, wherein said actuator is a push button directly connected to said first plate.

21. Apparatus as defined in claim 18 wherein said means for sliding said first interconnecting plate comprises a coiled spring operatively connected between the first plate of said maintaining means and said first interconnecting plate.

22. Apparatus as defined in claim 14 wherein said moving means comprises a driven capstan and a rotatable pinch roller movably mounted on said chassis for movement towards and away from the capstan; and means responsive to said stopping means for moving said pinch roller.

* * * * *